No. 721,876. PATENTED MAR. 3, 1903.
F. L. FAY.
AUTOMOBILE.
APPLICATION FILED JAN. 20, 1903.
NO MODEL.
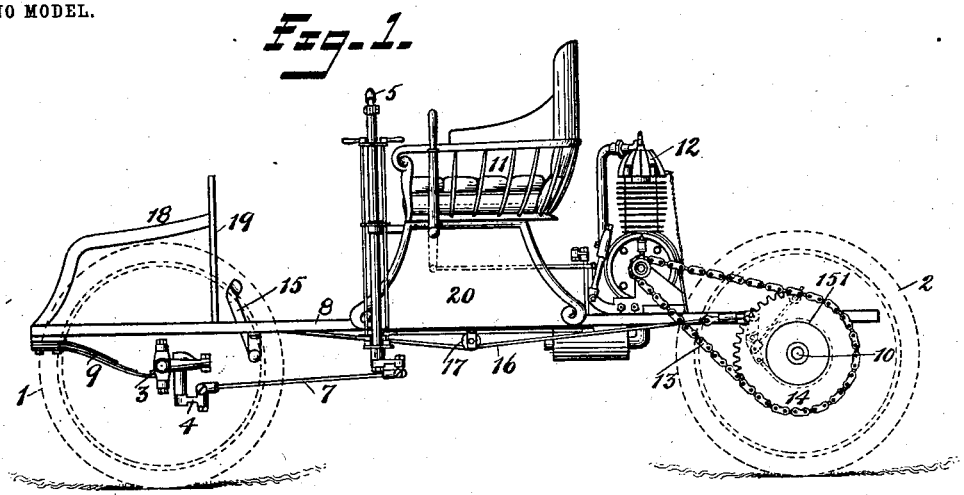
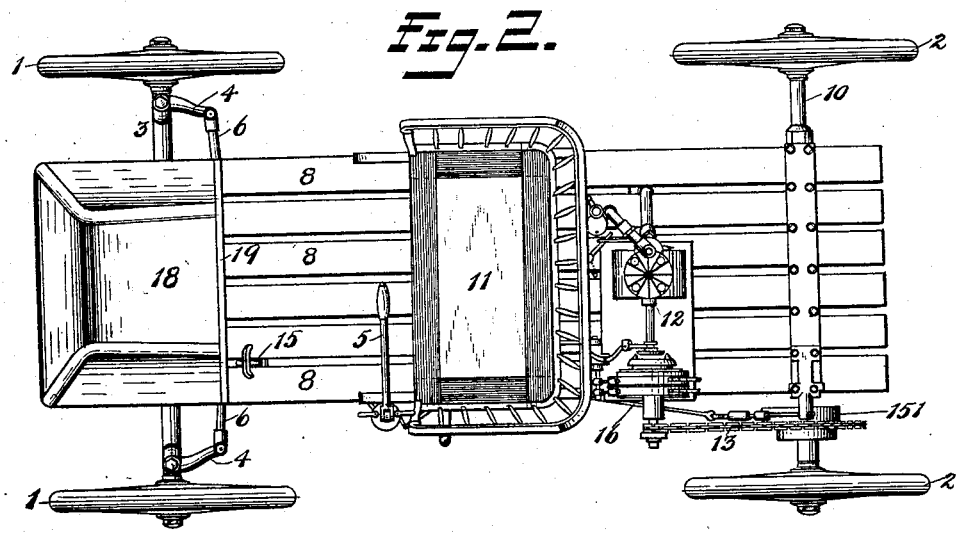
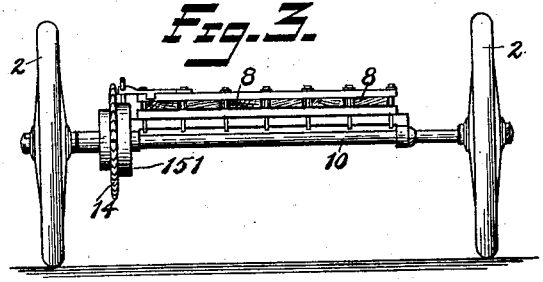
WITNESSES:
INVENTOR
Frederick L. Fay
BY
ATTORNEY

UNITED STATES PATENT OFFICE.

FREDERICK L. FAY, OF HOLYOKE, MASSACHUSETTS, ASSIGNOR TO SAMUEL M. GREEN, OF HOLYOKE, MASSACHUSETTS.

AUTOMOBILE.

SPECIFICATION forming part of Letters Patent No. 721,876, dated March 3, 1903.

Application filed January 20, 1903. Serial No. 139,728. (No model.)

*To all whom it may concern:*

Be it known that I, FREDERICK L. FAY, a citizen of the United States, residing at Holyoke, in the county of Hampden, State of Massachusetts, have invented certain new and useful Improvements in Automobiles, of which the following is a full, clear, and exact description.

My invention relates to automobiles; and it consists in the novel features of arrangement and construction set forth herein.

Among the objects which I seek to attain are simplicity of construction, ease of riding, effectiveness, and durability.

In the drawings, Figure 1 is a side elevation of my invention. Fig. 2 is a plan view thereof. Fig. 3 is a rear end elevation, those parts mounted upon the body being omitted.

1 1 are front steering-wheels.

2 2 are rear wheels, power being applied through the latter.

3 is a forward axle, to which the wheels 1 1 are pivotally connected.

4 4 are knuckles projecting from the bearings for the steering-wheels 1 1.

5 is a steering rod or handle.

6 6 7 are links connecting the steering-rod with the knuckles 4 4.

The form and arrangement of the steering mechanism is immaterial to this invention.

The body of the automobile is composed of flexible slats extending fore and aft. The length and number of the slats is immaterial. These slats are suitably secured together, but not so as to render them inflexible. The forward part of the body is perfectly connected with the axle 3 through the medium of springs 9. The rear part of the body is directly connected to the rear axle 10. Any vibration caused by traveling over the road is absorbed in the body, which bends throughout its length. By the omission of the rear springs several advantages hereinafter set forth are attained.

11 is a seat for the rider, and the same is preferably positioned substantially midway in the length of the flexible body. 12 is a motor mounted upon said flexible body between the forward and rear axles, so that it will rise and fall with the yielding part of the body and so that any severe jolting of the motor and its associated parts will be avoided.

13 is a chain passing over the sprocket 14 concentric with the driving-wheel and passing over another sprocket or wheel driven by the motor. Since the motor is mounted upon a yielding portion of the body, it will rise and fall or oscillate around the axis in common to the axis of the sprocket 14. Hence the tension of the chain 13 will be uniformly maintained irrespective of the oscillatory motion of that portion of the body directly supporting the motor.

Various means may be employed for controlling the motor; but the same are immaterial to this invention.

The brake mechanism may include a foot-operated lever 15, connected with the brake 151 by means of a suitable cord or rod 16. If desired, the latter may be spaced slightly away from the body by means of a roller 17. The connection is such that it in no degree impairs the flexibility of the body.

18 is a hood covering a storage-compartment in the forward end of the body.

19 is a dashboard.

20 is a box underneath the seat 11, which may provide another storage-compartment.

From the foregoing it will be seen that the springs 9 serve to absorb some of the vibration between the steering-wheels and the seat. These springs also compensate for some of the twisting strains encountered on an uneven road, thus relieving the body in this respect. The vibration of the rear wheels is taken directly by the body; but the latter being flexible and being yieldingly mounted on the axle 3 at its forward end absorbs it to such an extent that no severe or objectionable jolts are experienced by the rider nor imparted to the mechanism carried upon any yielding portion of the body. It is to avoid excessive jolting that the motor and the associated parts are mounted forward of the rear wheels.

Heretofore much damage has resulted from the breaking of chains in chain-driven automobiles, due to variation in tension while on the road. By the construction and arrangement illustrated and described herein it is obvious that when the chain is once properly adjusted its tension is uniformly maintained irrespective of the load, the bend of the body, or the unevenness of roads over which the vehicle is driven. Were the body inflexible and were a spring located between the rear portion of the body and the rear axle, it is apparent that if the chain were properly adjusted before the rider mounted the vehicle such adjustment would be improper after the weight of the rider is added, because it would cause the body to settle toward the axle and shorten the chain. Again, in such a construction if the vehicle is driven over rough roads and the body is caused to jump unduly high tension would be put upon the chain, and the same would be likely to break or bend the shaft, so as to throw the alinement out, and consequently impair the efficiency of the machine. Another advantage due to eliminating the spring between the body and the rear axle is that it permits the body to be hung very low. Inasmuch as the factor of safety is very much higher in vehicles in which the bodies are placed low, it is manifest that this construction may attain this advantage to its highest degree, since the body is substantially on a level with the axles, particularly when the seat is occupied. Another advantage of hanging the body low is in the reduction of wind resistance. As a direct result thereof a motor of light power may be more efficiently employed than were the body higher and the normal wind resistance relatively more.

What I claim is—

1. In an automobile, a front and rear axle, wheels carried thereby, a flexible body extending fore and aft and connected to said axles, the connection between the body and one of said axles being direct, a spring located between the other axle and the other end of said body, a motor carried by a yielding portion of said flexible body, and means for connecting said motor with the driving wheel or wheels.

2. In an automobile, a front and rear axle, wheels carried thereby, a body composed of flexible slats extending fore and aft and connected to said axles, the connection between said body and the rear axle being direct, a spring located between the body and the front axle, a motor carried by a yielding portion of the flexible body and a connection between the said motor and the wheel or wheels on the rear axle.

3. In an automobile, a front and rear axle, wheels carried thereby, a body composed of flexible slats extending fore and aft and connected to said axles, a motor carried by a yielding portion of said body, and a connection between said motor and the driving wheel or wheels.

4. An automobile including a flexible body extending fore and aft, a front axle and a rear axle, a rigid connection between said body and the rear axle, a pair of springs secured at the front end of said body one on each side and extending from the front end to be supported by the front axle, and a motor mounted to move yieldingly with said body portion and means for connecting said motor with said rear axle, the distance between the axial center of the rear axle and the axis of rotation of the motor being substantially invariable.

5. An automobile including a flexible body extending fore and aft, a front axle and a rear axle, a rigid connection between said body and the rear axle, a pair of springs secured at the front end of said body one on each side and extending to the rear of said front end to be supported by the front axle, and a motor mounted to move yieldingly with said body portion and means for connecting said motor with said rear axle, the distance between the axial center of the rear axle and the axis of rotation of the motor being substantially invariable.

Signed at Holyoke, Massachusetts, this 14th day of January, 1903.

FREDERICK L. FAY.

Witnesses:
A. C. LIVERMORE,
A. N. LA PORTE.